United States Patent [19]

Evers

[11] 3,903,166

[45] Sept. 2, 1975

[54] 1,11-BIS(3-AMINO-4-HYDROXYPHENYL)PERFLUORO-3,9-DIOXAUNDECANE

[75] Inventor: Robert C. Evers, Dayton, Ohio

[73] Assignee: The United States of America as represented by the Secretary of the Air Force, Washington, D.C.

[22] Filed: June 27, 1974

[21] Appl. No.: 483,735

Related U.S. Application Data

[62] Division of Ser. No. 401,000, Sept. 26, 1973, Pat. No. 3,846,376.

[52] U.S. Cl................. 260/571; 260/47 R; 260/71
[51] Int. Cl.$^2$......................................... C07C 93/14
[58] Field of Search.................................... 260/571

[56] References Cited
UNITED STATES PATENTS 2,103,188  12/1937  Semon et al...................... 260/571
3,654,364  4/1972  Meckel et al...................... 260/571

Primary Examiner—D. Horwitz
Attorney, Agent, or Firm—Joseph E. Rusz; Cedric H. Kuhn

[57] ABSTRACT

Perfluoroalkylene ether bibenzoxazole polymers, thermally stable at elevated temperatures, are prepared by the condensation of a perfluoroalkylene ether bisaminophenol and a perfluoroalkylene ether diimidate. Because of the high thermal stability and low glass transition temperatures of the polymers, they are eminently suitable for use in aerospace applications where a wide range of temperature conditions is encountered. In particular, the polymers are useful as sealants and seals.

1 Claim, No Drawings

1,11-BIS(3-AMINO-4-HYDROXYPHENYL)PERFLUORO-3,9-DIOXAUNDECANE

RIGHTS OF THE GOVERNMENT

The invention described herein may be manufactured and used by or for the Government of the United States for all governmental purposes without the payment of any royalty.

This application is a divisional of pending prior application Ser. No. 401,000 filed on Sept. 26, 1973 now U.S. Pat. No. 3,846,376.

FIELD OF THE INVENTION

This invention relates to thermally stable fluorinated polymers which are viscoelastic over a broad temperature range. In one aspect the invention relates to a process for synthesizing the fluorinated polymers. In another aspect it relates to monomers that are used in synthesizing the fluorinated polymers.

BACKGROUND OF THE INVENTION

There has existed for some time a need for thermally stable, elastomeric polymers for various aerospace seal and sealant applications. Furthermore, in order for a polymer to satisfy the requirements, it must retain its elastomeric properties at sub-zero temperatures. Still further, the polymers should possess other desirable properties such as hydrolytic stability and fuel resistance. None of the prior art elastomers appears to meet these broad use temperature range requirements.

It is an object of this invention, therefore, to provide thermally stable fluorinated polymers which are viscoelastic at sub-zero temperatures.

Another object of the invention is to provide a process for synthesizing the fluorinated polymers.

A further object of the invention is to provide monomers for use in preparing the fluorinated polymers.

Other objects and advantages of the invention will become apparent to those skilled in the art upon consideration of the following disclosure.

SUMMARY OF THE INVENTION

In one embodiment, the present invention resides in a thermally stable polymer composition having the following structural formula:

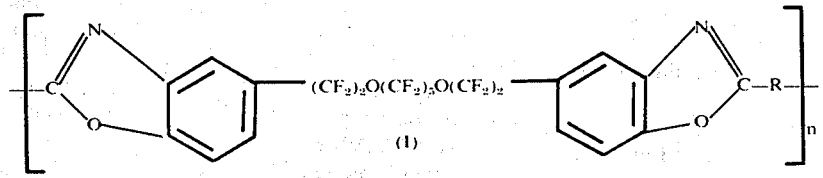
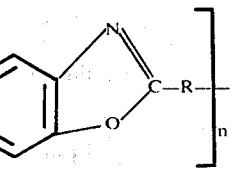

(1)

wherein R is $(CF_2)_8$, $(CF_2)O(CF_2)_2O(CF_2)$ or $(CF_2)_4O(CF_2)_2O(CF_2)$ and n is an integer equal to at least 2, preferably an integer in the range of about 8 to 100, inclusive. Alternatively, n can be defined as an integer having a value sufficient to provide a polymer having an inherent viscosity of at least 0.10, e.g., from about 0.10 to 1.0 when measured at 25°C as a 0.2 weight percent solution in hexafluoroisopropanol.

In another embodiment the present invention lies in a process for preparing perfluoroalkylene ether bibensoxazole polymers. Broadly speaking, the process comprises the step of reacting in an inert atmosphere 1,11-bis(3-amino-4-hydroxyphenyl)perfluoro-3,9-dioxaundecane with dimethyl perfluorosebacimidate; dimethyl perfluoro-3,6-dioxasuberimidate; or dimethyl perfluoro-3,6-dioxaundecanediimidate, the reaction being conducted in a solvent and in the presence of added glacial acetic acid. Examples of gases that can be used to provide an inert atmosphere include nitrogen, helium, and argon.

The condensation reaction involved in preparing the polymers of this invention is shown by the following equation:

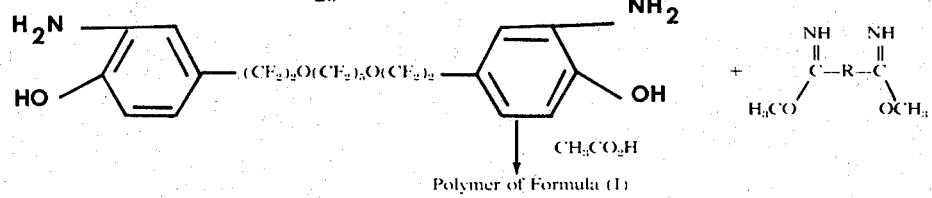
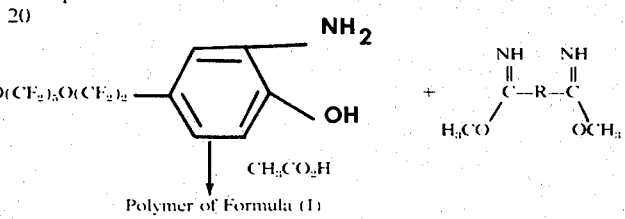

Polymer of Formula (1)

As seen from the equation, equimolar amounts of the bisaminophenol compound and the diimidate esters are utilized in the reaction. The mol ratio of glacial acetic acid to the diimidate ester is at least 2:1, e.g., 2 to 4:1. It is usually preferred to utilize four molar equivalents of acetic acid for each mol of the diimidate ester. The acetic acid reacts with ammonia formed during the condensation reaction, converting it to ammonium acetate and thereby driving the reaction to completion.

In carrying out the process, a halogenated hydrocarbon, which is a solvent for the monomers, is utilized as the reaction medium. In order to obtain high molecular weight polymers, it has been found to be necessary to employ hexafluoroisopropanol as the solvent. For example, when using trichlorotrifluoroethane as the solvent, the polymers obtained are lower in molecular weight than those produced with hexafluoroisopropanol. The temperature at which the condensation reaction is carried out usually falls within the range of about 45 to 58°C. The reaction period will depend upon the molecular weight that it is desired the polymer product to have, being longer for higher molecular weight products. Generally, the reaction time falls in the range of 7 to 14 days although shorter and longer periods can be employed.

At the end of the reaction period, the polymer is recovered and purified by a general procedure that is conventionally followed in solution polymerization processes. Thus, the reaction mixture is poured into a non-solvent for the polymer, e.g., into an alcohol such as methanol, thereby causing the polymer to precipitate from solution. The precipitation polymer is then separated from the liquid by any suitable means such as by filtration or decantation. After washing the separated polymer with an alcohol, it is then dissolved in a solvent such as hexafluoroisopropanol and again precipitated from solution by pouring the solution into methanol. After separation of the precipitated polymer, it is again washed with methanol and then dried under a vacuum. It is to be understood that the foregoing procedure can be repeated one or more times in order to further purify the product.

A more complete understanding of the invention can be obtained by referring to the following illustrative examples which are not intended, however, to be unduly limitative of the invention. 1,11-Bis(3-amino-4-(hydroxyphenyl)-perfluoro-3,9-dioxaundecane is a new compound which can be synthesized by the three-step procedure described in Example I. Dimethyl perfluorosebacimidate and dimethyl perfluoro-3,6-dioxasuberimidate are well known compounds which are described in the literature. A procedure for preparing dimethyl perfluoro-3,6-dioxaundecanediimidate is set forth in Example II.

EXAMPLE I a. 1,11-Bis(4-hydroxyphenyl)perfluoro-3,9-dioxaundecane

Copper bronze (5.08 g; 0.080 g atom) was added to a solution of p-iodophenyl acetate (7.86 g; 0.30 mol) and 1,11-diiodoperfluoro-3,9-dioxaundecane (7.36 g; 0.10 mol) (a product of Allied Chemical Corp.) in 45 ml of N,N-dimethyl formamide. The resulting slurry was stirred under nitrogen at 113°–116°C for 96 hours. After cooling the reaction mixture was added to a stirred mixture of 150 ml of ether and 200 ml of water. The copper salts and excess copper were filtered off and the ether layer was washed repeatedly with water until free from the reaction solvent. Evaporation of the ether gave a brown oil which was then refluxed for 15 minutes in 10 ml of acetic anhydride. The excess acetic anhydride was distilled off and the residue was taken up in 50 ml of petroleum ether. This solution was treated with charcoal, filtered, and reduced in volume to a light amber oil. Distillation yielded 5.1 g of 1,11-bis(4-acetoxyphenyl)perfluoro-3,9-dioxaundecane (boiling point - 195°–198°C at 0.55 mm Hg). This water-white oil was refluxed for 30 minutes in a solution of 5 ml of concentrated hydrochloric acid in 100 ml of methanol. The resultant solution was stripped to dryness to yield a pale yellow solid which was taken up in 600 ml of hexane. This solution was treated with charcoal, filtered and reduced in volume to 150 ml. The product recrystallized slowly to give 3.4 g (51% yield) of product in the form of white needles (melting point - 88°–90°C).

Analysis - Calc'd: C,37.72; H,1.50. Found: C,37.60; H,1.93. Molecular weight (mass spectroscopy) - Calc'd: 668. Found: 668.

b. 1,11-Bis(3-nitro-4-hydroxyphenyl)perfluoro-3,9-dioxaundecane 1,11-Bis(4-hydroxyphenyl)perfluoro-3,9-dioxaundecane (13.3 g; 0.02 mol) was added at room temperature to a solution of 15 ml of concentrated nitric acid in 150 ml of glacial acetic acid. The solution was stirred at 43°–47°C for 3 hours with care being taken to control any initial exotherms. A color change from light yellow through red and back to light orange was noted as the reaction progressed to completion. The cooled reaction mixture was added to 500 ml of ice water and the product was extracted with a liter of ether. The ether layer was washed repeatedly with water and finally with dilute sodium bicarbonate solution. The ether was stripped off under water aspirator pressure and the viscous residue was taken up in hot heptane. Distillation yielded 11.3 g (74% yield) of pale yellow product (boiling point - 190°–195°C at 0.25 mm Hg).

Analysis - Calc'd: C,33.26; H,1.07; N,3.69. Found: C,33.01; H,0.92; N,3.49. Molecular weight (mass spectroscopy) - Calc'd: 758. Found: 758.

c. 1,11-Bis(3-amino-4-hydroxyphenyl)perfluoro-3,9-dioxaundecane

A solution of 1,11-bis(3-amino-4-hydroxyphenyl)perfluoro-3,9-dioxaundecane (3.03 g; 0.004 mol) in 75 ml of absolute ethanol was deoxygenated by passing nitrogen through the boiling solution for 15 minutes. To the cooled solution there was added 10 ml of concentrated hydrochloric acid and 0.3 g of 10% palladium on charcoal catalyst. The catalytic reduction was run at room temperature and 50 psi of hydrogen for 3 hours. The catalyst was filtered off and the water-white solution was reduced to dryness under water aspirator pressure. The white residue was powdered and then slurried in 25 ml of distilled water. Careful neutralization with solid sodium bicarbonate yielded a buff-colored solid which was isolated by filtration and dried in a vacuum oven at room temperature for several hours. The product was dissolved in 180 ml of benzene, treated with charcoal and allowed to recrystallize from a reduced volume of 100 ml of solution. The off-white solid was redissolved in 1500 ml of heptane, treated with charcoal, and allowed to recrystallize from a reduced volume of 400 ml of solution. Additional recrystallization from benzene and heptane yielded 1.7 g (60% yield) of slightly off-white product (melting point - 132°–135°C).

Analysis - Calc'd: C,36.12; H,1.73; N,4.01. Found: C,36.22; H,2.06; N,3.77. Molecular weight (mass spectroscopy) - Calc'd: 698. Found: 698.

EXAMPLE II

Hexafluoroglutaryl fluoride (108 g) was added to a slurry of cesium fluoride (3.0 g) in tetraglyme (50 ml) and the mixture was stirred at 35°C for one-half hour. The mixture was cooled to 0°C to −10°C and tetrafluoroethylene oxide was added through a vacuum manifold under a total pressure of about 400 mm Hg. Samples were withdrawn at various intervals for gas chromatographic analysis and the reaction was terminated when 119 g of tetrafluoroethylene oxide had been added.

The above reaction mixture was added to an excess of methanol and the product (240 g) was washed repeatedly with water and dried. This mixture of diesters was dissolved in trichlorotrifluoroethane and ammonia was bubbled through the solution. After several hours a voluminous white solid had precipitated. The reaction was terminated when the refluxing ammonia had brought the temperature of the reaction mixture down to about 0°C. After warming to room temperature, the solvent was removed under vacuum and the solid product dried (195 g).

The above diamides were mixed with phosphorous pentoxide (500 g) and the mixture was heated at 250°C for several hours. The product (112 g) was removed under vacuum. Redistillation gave a fraction (43.5 g) boiling at 128°C which was identified by infrared and nuclear magnetic resonance spectroscopy as $NC(CF_2)_4OCF_2CF_2OCF_2CN$.

Perfluoro-3,6-dioxaundecanedinitrile, $NC(CF_2)_4OCF_2CF_2OCF_2CN$, (42 g) was added dropwise to an excess of methanol (100 ml) containing a trace of sodium methylate. An exothermic reaction ensued and the mixture was stirred at ambient temperature overnight. The reaction mixture was poured into water and the product extracted with trichlorotrifluoroethane. Distillation gave a fraction (36.0 g) boiling at 92°–94°C at 3.5 mm Hg. Gas chromatographic analysis showed a single component of 99.4% purity. The product was identified by infrared and nuclear magnetic resonance spectroscopy as dimethyl perfluoro-3,6-dioxaundecanediimidate.

Molecular Weight (mass spectroscopy) - Calc'd: 498. Found: 498.

EXAMPLE III

A run was conducted in which a polymer of the present invention was synthesized. In this run 5 ml of redistilled hexafluoroisopropanol was added to a mixture of dimethyl perfluoro-3,6-dioxasuberimidate (0.350 g; 0.0011 mol) and 1,11-bis(3-amino-4-hydroxyphenyl)-perfluoro-3,9-dioxaundecane (0.702 g; 0.0011 mol), prepared as described in Example I. Glacial acetic acid (0.25 g; 0.004 mol) was added with stirring to the resulting clear amber solution. The polycondensation reaction was allowed to proceed under a blanket of nitrogen at 53°–57°C for 8 days at which time the viscous amber solution was poured into 100 ml of cold methanol (−78°C). The precipitated white fibrous polymer was allowed to settle and the clear supernatant liquid was decanted. The polymer was washed several times with cold methanol (−78°C), redissolved in hexafluoroisopropanol, and then reprecipitated by pouring the solution into cold methanol. Thorough washing of the product with cold methanol followed by drying at 150°C and 0.01 mm of Hg yielded 0.55 g (58% yield) of a tough rubbery polymer. The polymer had an inherent viscosity of 0.40 as measured in hexafluoroisopropanol at 25°C.

Analysis - Calc'd: C,34.20; H,0.63; N,2.95. Found: C,34.55; H,1.01; N,3.02.

Thermogravimetric analysis of the polymer product indicated that the beginning of breakdown in air occurred at 450°C with a 10 percent weight loss at 500°C. Differential scanning calorimetry revealed a glass transition temperature of −17°C.

EXAMPLE IV

Another run was conducted in which a polymer of this invention was synthesized. Thus, dimethyl perfluoro-3,6-dioxaundecanediimidate (0.498 g; 0.0010 mol) and 1,11-bis(3-amino-4-hydroxyphenyl)perfluoro-3,9-dioxaundecane (0.698 g; 0.0010 mol) were weighed into a 15 ml round bottom reaction flask. Hexafluoroisopropanol (5 ml) was added and the mixture was stirred for several minutes until a clear, pale yellow solution was obtained. Glacial acetic acid (0.25 g; 0.0042 mol) was added after which the reaction mixture was stirred for 11 days under nitrogen at 50°C. The resultant viscous amber solution was slowly added to 150 ml of cold methanol (−78°C), thereby precipitating the polymer. The polymer was washed several times with cold methanol after which it was redissolved in trichlorotrifluoroethane. The polymer was reprecipitated by pouring the solution into cold methanol. Several washings with methanol followed by drying at 180°C and 0.01 mm Hg gave 0.70 g (71% yield) of light amber, rubbery polymer. The polymer had an inherent viscosity of 0.79 in hexafluoroisopropanol at 25°C.

Analysis - Calc'd: C,32.81; H,0.55; N,2.55. Found: C,32.64; H,0.54; N,2.87.

EXAMPLE V

A series of runs was conducted in which polymers were prepared that consisted essentially of the following repeating units:

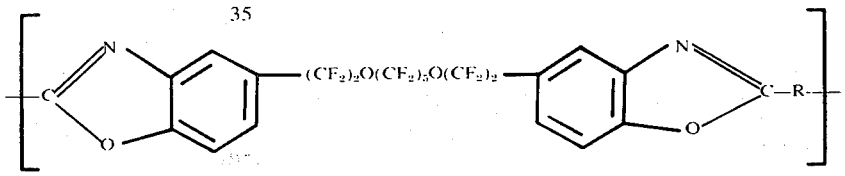

wherein R is as indicated hereinabove. In the runs 1,11-bis(3-amino-4-hydroxyphenyl)perfluoro-3,9-dioxaundecane was reacted in equimolar amounts with dimethyl perfluorosebacimidate [$R=(CF_2)_8$]; dimethyl perfluoro-3,6-dioxasuberimidate [$R=(CF_2)O(CF_2)_2O(CF_2)$]; and dimethyl perfluoro-3,6-dioxaundecanediimidate [$R=(CF_2)_4O(CF_2)_2O(CF_2)$]. In each run the reaction was carried out at about 50°C, in the presence of glacial acetic acid utilizing hexafluoroisopropanol (HFIP) as the reaction medium. The mol ratio of acetic acid to the amount of the monomers used in each of the runs was 2:1. The procedure described in Example III was followed in recovering and purifying the polymers. Reaction conditions are shown below in Table I while elemental analysis data and properties of the polymer products are listed in Table II.

TABLE I

| Run No. | R[1] | Reaction Period, hrs | Reaction Concentration,[2] G. Equiv. Polymer × 10¹ 10 ml HFIP |
|---|---|---|---|
| 1. | $(CF_2)_8$ | 192 | 3 |
| 2. | $(CF_2)O(CF_2)_2O(CF_2)$ | 192 | 14 |
| 3. | $(CF_2)O(CF_2)_2O(CF_2)$ | 192 | 20 |
| 4. | $(CF_2)_4O(CF_2)_2O(CF_2)$ | 264 | 20 |

[1] Radical derived from diimidate ester.
[2] G. Equiv. = equivalent weight of polymer repeating unit.

TABLE II

| Run No. | Inherent[1] Viscosity, dl/g | Analysis - Calc'd/Found | | | Tg,°C[2] |
|---|---|---|---|---|---|
| | | C | H | N | |
| 1. | 0.20 | 33.35 / 33.34 | 0.54 / 0.70 | 2.51 / 2.74 | −5 |
| 2. | 0.28 | 34.20 / 34.67 | 0.63 / 0.90 | 2.95 / 3.18 | −16 |
| 3. | 0.40 | 34.20 / 34.27 | 0.63 / 0.71 | 2.95 / 3.14 | −15 |
| 4. | 0.79 | 32.81 / 32.64 | 0.55 / 0.54 | 2.55 / 2.87 | −20 |

[1] 0.2g/dl at 25°C in HFIP.
[2] Glass transition temperature as determined by differential scanning calorimetry.

The polymers appeared to be unaffected by contact with JP-4 jet fuel. For example, a sample of the polymer from run 4 was stirred in JP-4 for one week at 60°C without showing any signs of swelling.

The thermal stability of the polymers was evaluated by thermogravimetric analysis under both air and nitrogen atmospheres. Onset of breakdown in air occurred in the 400° to 450°C range with complete weight loss at about 600°C. Under a nitrogen atmosphere the onset of breakdown in most cases was not significantly higher, but a weight residue of 10 to 30 percent remained at 900°C.

The data in the foregoing examples indicate that the products of this invention are thermally stable, elastomeric polymers which have a low glass transition temperature. The broad use temperature range of the polymers and their fuel resistance render them useful for many aerospace applications, particularly as sealants and seals.

In view of the foregoing disclosure, various modifications of the invention can be made by those skilled in the art without departing from the spirit and scope of the invention.

I claim:

1. As a new composition of matter, 1,11-bis(3-amino-4-hydroxyphenyl)perfluoro-3,9-dioxaundecane.

* * * * *